United States Patent
Choi et al.

(10) Patent No.: US 11,514,908 B2
(45) Date of Patent: Nov. 29, 2022

(54) VOICE COMMAND RECOGNITION DEVICE AND METHOD THEREOF

(71) Applicants: HYUNDAI MOTOR COMPANY, Seoul (KR); KIA MOTORS CORPORATION, Seoul (KR)

(72) Inventors: Seo Hwan Choi, Seoul (KR); Jae Min Joh, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 251 days.

(21) Appl. No.: 16/868,028

(22) Filed: May 6, 2020

(65) Prior Publication Data

US 2021/0174797 A1 Jun. 10, 2021

(30) Foreign Application Priority Data

Dec. 9, 2019 (KR) .......... 10-2019-0162818

(51) Int. Cl.
*G10L 15/22* (2006.01)
*G06F 3/16* (2006.01)

(52) U.S. Cl.
CPC .......... *G10L 15/22* (2013.01); *G06F 3/167* (2013.01); *G10L 2015/223* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| | | | | |
|---|---|---|---|---|
| 5,748,191 A | * | 5/1998 | Rozak | G06F 3/16 704/E15.04 |
| 2014/0062297 A1 | * | 3/2014 | Bora | H05B 45/10 315/297 |
| 2014/0082501 A1 | * | 3/2014 | Bae | G06F 3/167 715/728 |
| 2015/0140990 A1 | * | 5/2015 | Kim | H04W 8/186 455/418 |
| 2015/0350031 A1 | * | 12/2015 | Burks | H04W 76/16 715/736 |
| 2016/0099815 A1 | * | 4/2016 | Park | H04W 4/70 370/254 |
| 2017/0084273 A1 | * | 3/2017 | Zohar | G10L 15/10 |
| 2017/0097618 A1 | * | 4/2017 | Cipollo | H04Q 9/00 |
| 2017/0097621 A1 | * | 4/2017 | Ackmann | G05B 19/0426 |
| 2018/0004747 A1 | * | 1/2018 | Smith | H04N 7/185 |
| 2018/0091381 A1 | * | 3/2018 | McLaughlin | G06Q 10/063 |
| 2018/0143802 A1 | * | 5/2018 | Jang | G10L 15/30 |
| 2018/0323996 A1 | * | 11/2018 | Roman | H04L 12/282 |
| 2019/0103103 A1 | * | 4/2019 | Ni | G06F 3/167 |
| 2019/0361575 A1 | * | 11/2019 | Ni | H04L 67/306 |
| 2021/0174797 A1 | * | 6/2021 | Choi | G10L 15/22 |
| 2021/0326103 A1 | * | 10/2021 | Mutagi | G06F 3/167 |
| 2021/0334628 A1 | * | 10/2021 | Carbune | G06N 3/02 |

* cited by examiner

*Primary Examiner* — Jonathan C Kim
(74) *Attorney, Agent, or Firm* — McDonnell Boehnen Hulbert & Berghoff LLP

(57) ABSTRACT

A voice command recognition device and a method thereof are provided. The voice command recognition device includes a processor that registers one or more voice commands selected by analysis of one or more voice commands repeatedly used by a user or a voice command utterance pattern of the user to generate one package command and a storage storing data or an algorithm for speech recognition by the processor.

17 Claims, 9 Drawing Sheets

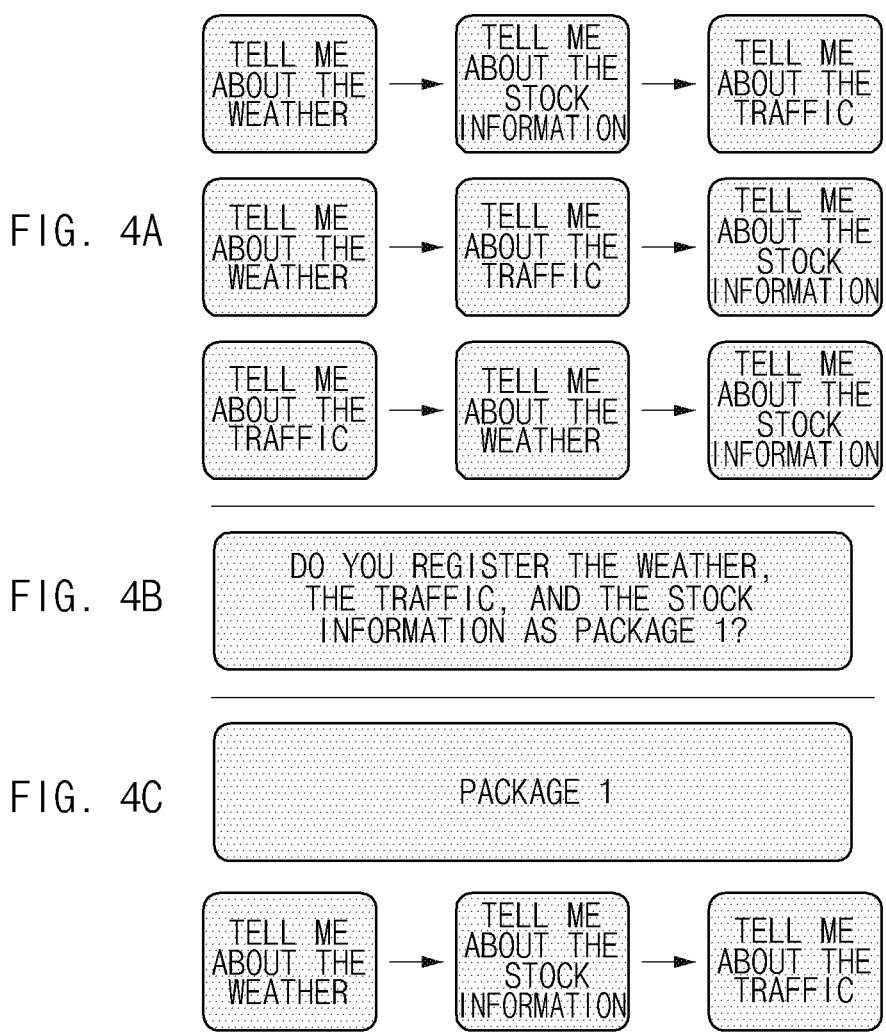

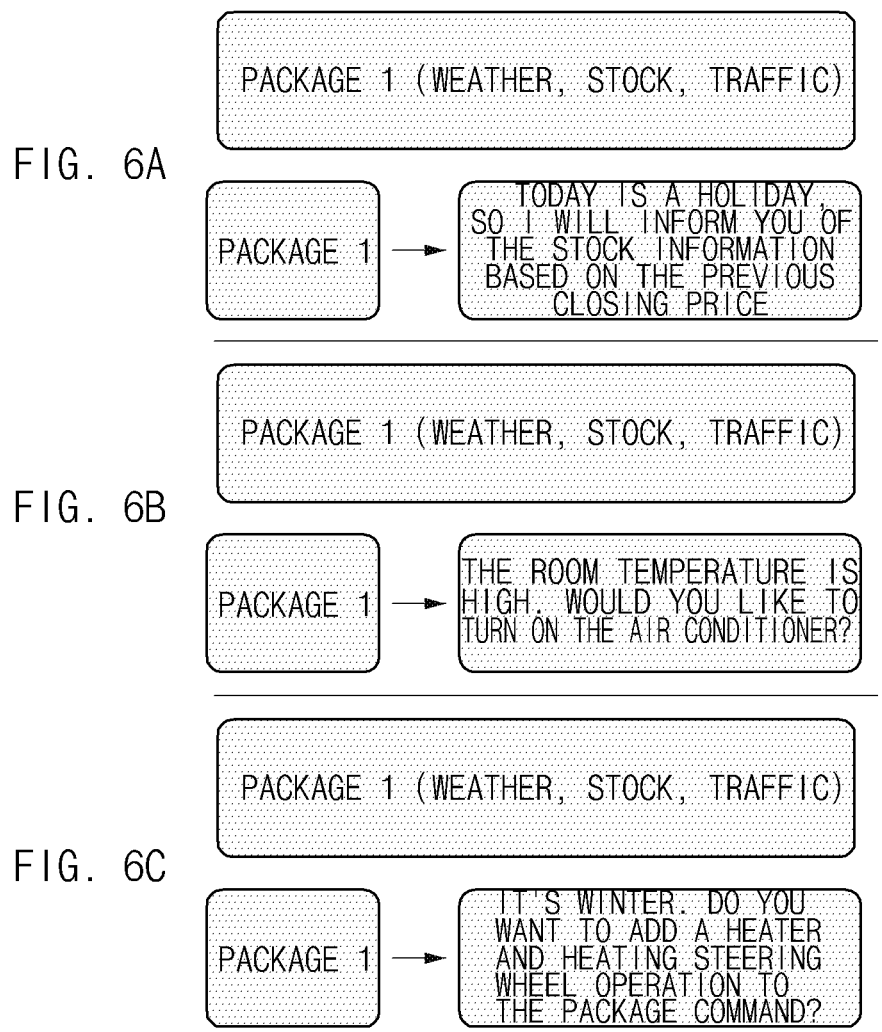

FIG. 8C

DO YOU ADD [TURN ON THE AIR CONDITIONER] TO PACKAGE 1?

VOICE COMMAND RECOGNITION DEVICE AND METHOD THEREOF

CROSS-REFERENCE TO RELATED APPLICATION

This application is claims the benefit of priority to Korean Patent Application No. 10-2019-0162818, filed in the Korean Intellectual Property Office on Dec. 9, 2019, the entire contents of which are incorporated herein by reference.

TECHNICAL FIELD

The present disclosure relates to a voice command recognition device and a method thereof, and more particularly, relates to technologies of registering and executing a plurality of voice commands as a package.

BACKGROUND

Recently, technologies for executing an electronic device through speech recognition have been developed to be applied to various fields. Technologies of recognizing voices of a driver and executing devices in the vehicle for safety in the vehicle have been developed.

When a user outputs a voice command, an existing speech recognition technology analyzes a domain for the output voice command, may perform speech recognition based on a database for each domain, and outputs the speech recognition result.

When the same device is executed every day, the same user should utter a voice command every day. Because a different recognition rate occurs whenever the same command is uttered, there is a need for repeatedly using the command.

SUMMARY

The present disclosure has been made to solve the above-mentioned problems occurring in the prior art while advantages achieved by the prior art are maintained intact.

An aspect of the present disclosure provides a voice command recognition device for analyzing one or more voice commands repeatedly used by a user or a voice command utterance pattern of the user to generate the one or more voice commands as one package command and a method thereof.

Another aspect of the present disclosure provides a voice command recognition device for determining whether to perform separate commands in one package command sequentially or at the same time, when the one package command is uttered, and a method thereof.

Another aspect of the present disclosure provides a voice command recognition device for analyzing a voice command additionally uttered after one previously generated package command is uttered and performing one of addition, correction, or deletion for one package command and a method thereof.

Another aspect of the present disclosure provides a voice command recognition device for determining a current surrounding situation when one previously generated package command is uttered and performing addition, correction, or deletion for the one package command and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a voice command recognition device may include a processor that registers one or more voice commands selected by analyzing one or more voice commands repeatedly used by a user or a voice command utterance pattern of the user to generate one package command and a storage storing data or an algorithm for speech recognition by the processor.

In an embodiment, the processor may determine whether to perform the one or more voice commands, registered with the one package command, sequentially or at the same time, when the one package command is uttered.

In an embodiment, the processor may perform the one or more voice commands sequentially when domains of the one or more voice commands registered with the one package command are the same as each other and may perform the one or more voice commands at the same time when the domains differ from each other.

In an embodiment, the processor may previously collect information about a voice command to be performed subsequently when sequentially performing the one or more voice commands registered with the one package command, after the one package command is uttered.

In an embodiment, the processor may analyze the voice command utterance pattern by identifying whether there is a command performed sequentially within a threshold time after one command is uttered and may generate the command as the one package command when the command performed sequentially within the threshold time is uttered over a predetermined number of times.

In an embodiment, the processor may recognize that the same command is performed although the one or more voice commands are changed in order and are uttered and may increase the number of utterances.

In an embodiment, the processor may additionally register an additionally uttered voice command with the one package command, when there is the voice command additionally uttered after the one package command is uttered.

In an embodiment, the processor may perform one or more voice commands previously registered with the one package command and the additionally uttered voice command together, when the one package command with which the additionally uttered voice command is additionally registered is uttered.

In an embodiment, the processor may delete a voice command requested to be canceled among the one or more voice commands registered with the one package command, when the command to request to cancel one of the one or more voice commands registered with the package command is additionally uttered, after the one package command is uttered.

In an embodiment, the processor may perform the other voice commands except for the command deleted among one or more voice commands previously registered with the one package command, when a package command from which the voice command requested to be deleted is deleted is uttered.

In an embodiment, the processor may propose correcting some of one or more voice commands registered with the one package command or adding a voice command, based on a surrounding situation, when the one package command is uttered.

In an embodiment, the surrounding situation may include at least one or more of temperature, humidity, weather, illumination intensity, a season, a date, a day, a time, a location, a traffic situation, or a vehicle speed.

In an embodiment, the processor may analyze a voice command additionally uttered after the one package command is uttered and may perform at least one or more of correction, deletion, or addition for the one package command.

According to another aspect of the present disclosure, a voice command recognition method may include analyzing one or more voice commands repeatedly used by a user or a voice command utterance pattern of the user and registering one or more voice commands selected by the analysis of the one or more voice commands repeatedly used by the user or the voice command utterance pattern of the user to generate one package command.

In an embodiment, the voice command recognition method may further include determining whether to perform the one or more voice commands, registered with the one package command, sequentially or at the same time, when the one package command is uttered.

In an embodiment, the voice command recognition method may further include performing the one or more voice commands sequentially when domains of the one or more voice commands registered with the one package command are the same as each other, and performing the one or more voice commands at the same time when the domains differ from each other and previously collecting information about a voice command to be performed subsequently when sequentially performing the one or more voice commands registered with the one package command, after the one package command is uttered.

In an embodiment, the generating of the one package command may include analyzing the voice command utterance pattern by identifying whether there is a command performed sequentially within a threshold time after one command is uttered, and generating the command as the one package command when the command performed sequentially within the threshold time is uttered over a predetermined number of times and recognizing that the same command is performed although the one or more voice commands are changed in order and are uttered and increasing the number of utterances.

In an embodiment, the voice command recognition method may further include additionally registering an additionally uttered voice command with the one package command, when there is the voice command additionally uttered after the one package command is uttered.

In an embodiment, the voice command recognition method may further include deleting a voice command requested to be canceled among the one or more voice commands registered with the one package command, when the command to request to cancel one of the one or more voice commands registered with the package command is additionally uttered, after the one package command is uttered.

In an embodiment, the voice command recognition method may further include proposing correcting some of the one or more voice commands registered with the one package command or adding a voice command, based on a surrounding situation, when the one package command is uttered and analyzing a voice command additionally uttered after the one package command is uttered and performing at least one of correction, deletion, or addition for the one package command.

BRIEF DESCRIPTION OF THE DRAWINGS

The above and other objects, features and advantages of the present disclosure will be more apparent from the following detailed description taken in conjunction with the accompanying drawings:

FIGS. 4A, 4B, and 4C, are exemplary screens illustrating a process of registering and processing a package command using a voice command utterance pattern of a user according to an embodiment of the present disclosure;

FIGS. 6A, 6B, and 6C are exemplary screens illustrating a process of correcting a previously generated package command depending on a surrounding situation when the previously generated package command is uttered, according to an embodiment of the present disclosure;

FIGS. 8A, 8B, 8C, 8D, and 8E are exemplary screens illustrating a process in which situations of FIGS. 3 to 7 are implemented in a complex manner, according to an embodiment of the present disclosure.

DETAILED DESCRIPTION

Figure 1:
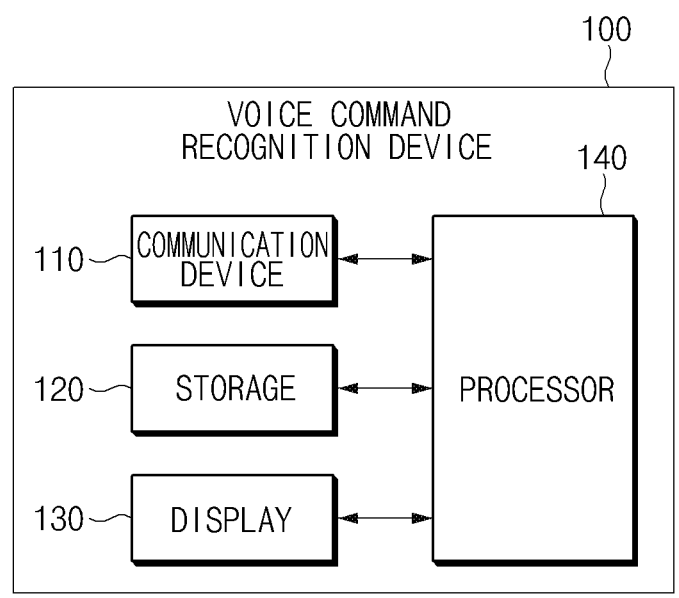
FIG. 1 is a block diagram illustrating a configuration of a voice command recognition device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An embodiment of the present disclosure may disclose a configuration of identifying presence of a command sequentially uttered within a threshold time after one command is uttered to generate one package command and a configuration of determining whether to execute separate commands in the package command sequentially or at the same time and performing the package command.

Hereinafter, a description will be given in detail of embodiments of the present disclosure with reference to FIGS. 1 and 9.

FIG. 1 is a block diagram illustrating a configuration of a voice command recognition device according to an embodiment of the present disclosure.

A voice command recognition device 100 according to an embodiment of the present disclosure may be implemented in a vehicle. In this case, the voice command recognition device 100 may be integrally formed with control units in the vehicle, or may be implemented as a separate device to be connected with the control units of the vehicle by a separate connection means.

The voice command recognition device 100 may register one or more voice commands selected by analyzing one or more voice commands repeatedly used by a user and a voice command utterance pattern of the user to generate the one or more voice commands as one package command.

Furthermore, the voice command recognition device 100 may analyze a voice command additionally uttered after one previously generated package command is uttered and may perform one of addition, correction, and deletion for the one package command.

Furthermore, the voice command recognition device 100 may determine a current surrounding situation when one previously generated package command is uttered and may perform one of addition, correction, and deletion for the one package command.

Referring to FIG. 1, the voice command recognition device 100 may include a communication device 110, a storage 120, a display 130, and a processor 140.

The communication device 110 may be a hardware device implemented with various electronic circuits to transmit and receive a signal through a wireless or wired connection. In an embodiment of the present disclosure, the communication device 110 may perform network communication technology in the vehicle and may perform vehicle-to-infrastructure (V2I) communication with a server, an infrastructure, or another vehicle outside the vehicle using wireless internet technology or short range communication. Herein, the network communication technology in the vehicle may be to perform inter-vehicle communication through controller area network (CAN) communication, local interconnect network (LIN) communication, flex-ray communication, or the like. Furthermore, the wireless internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may receive data for speech recognition from an external server and may communicate with a device in the vehicle to perform a voice command.

The storage 120 may store data and/or algorithms necessary for an operation of the processor 140, particularly, algorithms and data associated with speed recognition.

As an example, the storage 120 may store a database for each domain for speech recognition.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display 130 may include an input means for receiving a control command form the user and an output means for outputting the result of speech recognition of the voice command recognition device 100. Herein, the input means may include a microphone or the like. In this case, the microphone or the like may be provided independently of the display 130. The output means may include a display and may further include a voice output means such as a speaker. In this case, a touch sensor such as a touch film, a touch sheet, or a touch pad is provided in the display, the display operates as a touchscreen and may be implemented in a form where the input means and the output means are integrated with each other. In an embodiment of the present disclosure, the output means may output a speech recognition result or the results of one or more of generation, addition, correction, or deletion for a package command.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected with the communication device 110, the storage 120, the display 130, or the like and may electrically control the respective components. The processor 140 may be an electrical circuit which executes instructions of software and may perform a variety of data processing and calculation described below.

The processor 140 may process a signal delivered between respective components of the voice command recognition device 100. The processor 140 may include, for example, a speech recognition engine.

The processor 140 may analyze one or more voice commands repeatedly used by the user or may analyze a voice command utterance pattern of the user. In this case, when the number of times of using the voice command used by the user is greater than or equal to a predetermined number of times (N times), the processor 140 may determine the voice command as a voice command repeatedly used. Furthermore, when one or more voice commands are sequentially uttered, the processor 140 may increase the number of utterances irrespective of an order where the one or more voice commands are uttered and may select the voice command as a voice command repeatedly used. In other words, when the one or more voice commands are uttered over a predetermined number of times or when the one or more voice commands are changed in order and are uttered, the processor 140 may recognize that the same command is performed and may increase the number of utterances.

The processor 140 may register one or more voice commands selected by analyzing one or more voice commands repeatedly used by the user and a voice command utterance pattern of the user to generate the one or more voice commands as one package command.

When one package command is uttered, the processor 140 may determine whether to perform one or more voice commands registered with the one package command sequentially or at the same time.

When domains of the one or more voice commands registered with the one package command are the same as each other, the processor 140 may perform the one or more voice commands sequentially. When the domains differ from each other, the processor 140 may perform the one or more voice commands at the same time. After one package command is uttered, when sequentially performing one or more voice commands registered with the one package command, the processor 140 may previously collect information about a voice command to be performed subsequently, thus improving a speed at which the voice command is performed.

The processor 140 may analyze the voice command utterance pattern by identifying whether there is a command uttered sequentially within a threshold time after one command is uttered. When the command uttered sequentially within the threshold time is uttered over a predetermined number of times, the processor 140 may generate the command as one package command.

When one or more voice commands are changed in order and are uttered, the processor 140 may recognize that the same command is performed and may increase the number of utterances.

When there is a voice command additionally uttered after one package command is uttered, the processor 140 may additionally register the additionally uttered voice command with the one package command.

When one package command with which the additionally uttered voice command is additionally registered is uttered, the processor 140 may perform one or more voice commands previously registered with the one package command and the additionally uttered voice command together.

After one package command is uttered, when a command to request to cancel one of one or more voice commands registered with the package command is additionally uttered, the processor 140 may delete the voice command requested to be deleted among the one or more voice commands registered with the one package command.

When a package command from which the voice command requested to be deleted is deleted is uttered, the processor 140 may perform the other voice commands except for the command deleted among the one or more voice commands previously registered with the one package command.

When one package command is uttered, the processor 140 may propose correcting some of one or more voice commands registered with the one package command or adding a voice command, based on a surrounding situation. In this case, the surrounding situation may include at least one or more of temperature, humidity, weather, illumination intensity, a season, a date, a day, a time, a location, a traffic situation, and a vehicle speed.

The processor 140 may analyze a voice command additionally utter after one package command is uttered and may perform one or more of correction, deletion, or addition for the one package command.

As such, an embodiment of the present disclosure may integrally register and perform one or more voice commands, which are repeatedly used, into one package command such that the user utters the one package command without uttering several voice commands, thus improving a speed recognition rate and increasing a voice command processing speed.

Furthermore, an embodiment of the present disclosure may analyze a command pattern of the user or may determine a surrounding situation and may perform one of correction, deletion, or addition for a previously generated package command.

Figure 2:
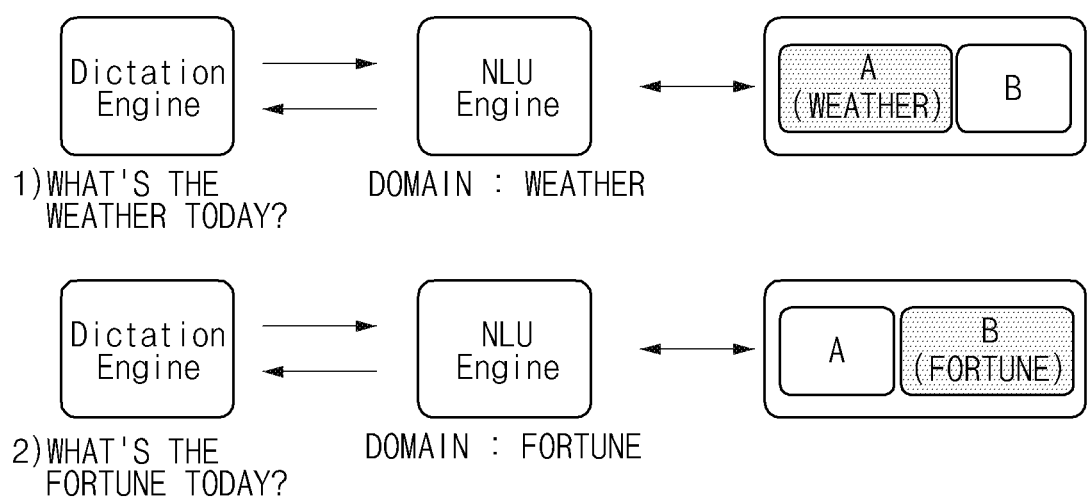
FIG. 2 is an exemplary screen illustrating a speed recognition analysis process for each domain according to an embodiment of the present disclosure.

FIG. 2 is an exemplary screen illustrating a speed recognition analysis process for each domain according to an embodiment of the present disclosure.

Referring to FIG. 2, when a user utters "What's the weather day", a voice command recognition device 100 of FIG. 1 may analyze a domain and may collect and output information about "weather". Furthermore, when the user utters "What's my fortune today?", the voice command recognition device 100 may analyze a domain and may collect and output information about "fortune".

Hereinafter, a description will be given in detail of a process of registering, canceling, or adding one or more voice commands to a package command with reference to FIGS. 3 to 8.

Hereinafter, it is assumed that a voice command recognition device 100 of FIG. 1 performs a process of FIGS. 3 to 8. Furthermore, an operation being described in a description of FIGS. 3 to 8 may be understood as being controlled by a processor 140 of the voice command recognition device 100.

Figure 3A:
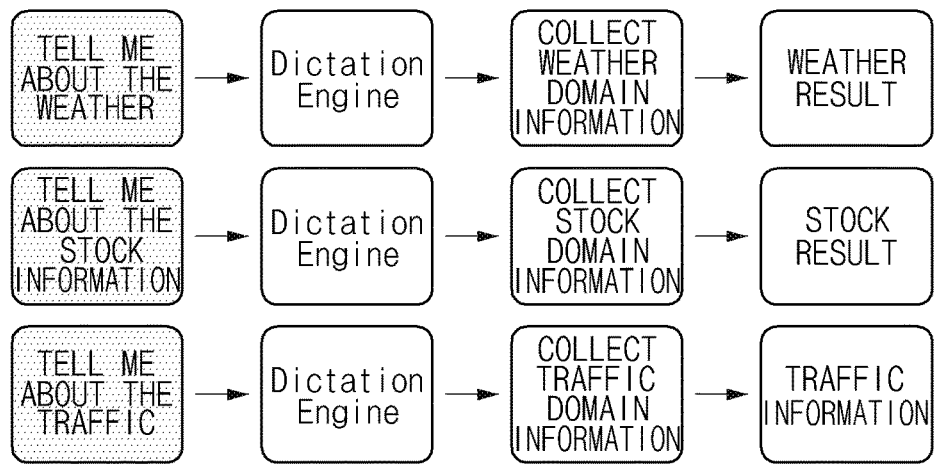
FIGS. 3A, 3B, and 3C are exemplary screens illustrating a process of registering and processing a package command using one or more voice commands which are repeatedly used, according to an embodiment of the present disclosure.
Figure 3B:
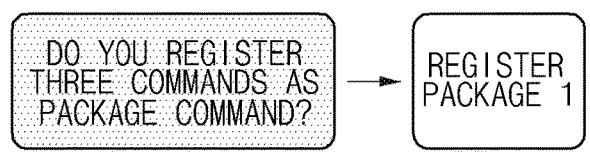
Figure 3C:
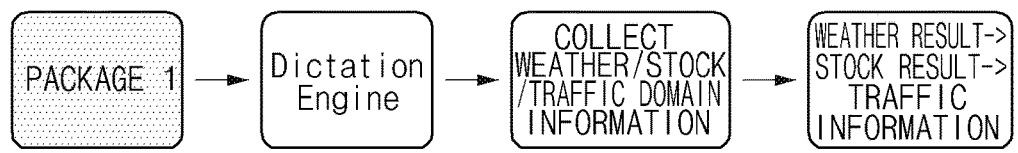

FIGS. 3A-3C are exemplary screens illustrating a process of registering and processing a package command using one or more voice commands which are repeatedly used, according to an embodiment of the present disclosure.

Referring to FIGS. 3A-3C, an embodiment is exemplified as a voice command recognition device 100 collects a voice command performed after a vehicle is started, registers one or more commands repeatedly used by a user with one package command, and performs the one or more registered voice commands when the one package command is uttered.

When three voice commands "Tell me about the weather", "Tell me about the stock information", and "Tell me about the traffic" are repeatedly uttered as in FIG. 3A, reference numeral 302, the voice command recognition device 100 may propose registering the three commands as a package command as in FIG. 3B.

When the package command is registered, as shown in FIG. 3C, when "package 1" is uttered as the package command, the voice command recognition device 100 may collect and output information about weather, stock, and traffic domains.

FIGS. 4A-4C are exemplary screens illustrating a process of registering and processing a package command using a voice command utterance pattern of a user according to an embodiment of the present disclosure.

Referring to FIGS. 4A-4C, a voice command recognition device 100 of FIG. 1 may collect a voice command performed after a vehicle is started and may analyze a voice command utterance pattern of a user.

When voice commands "Tell me about the weather", "Tell me about the stock information", and "Tell me about the traffic" are changed in order and are uttered, the voice command recognition device 100 may analyze a frequency of utterance of each voice command and a time difference between the voice commands and may recognize that the same command is performed although the commands are changed in order and are performed, thus increasing the number of utterances. In other words, as shown in FIG. 4A, although the voice commands "Tell me about the weather", "Tell me about the stock information", and "Tell me about the traffic" are changed in order, the voice command recognition device 100 may record that the three commands are uttered three times.

When a set of the three commands is uttered over a predetermined number of times and when a final command is performed, as shown in FIG. 4B, the voice command recognition device 100 may propose registering the three commands as one package command (package 1) to a user.

When the three commands are registered as the package command (package 1), as shown in FIG. 4C, when the user utters "package 1", the voice command recognition device 100 may sequentially perform the voice commands "Tell me about the weather", "Tell me about the stock information", and "Tell me about the traffic". In this case, when domains of the one or more executed commands differ from each other, the voice command recognition device 100 may previously collect information about a command to be performed subsequently while a command first performed is performed and may quickly provide the information.

Figures 5A, 5B, 5C:
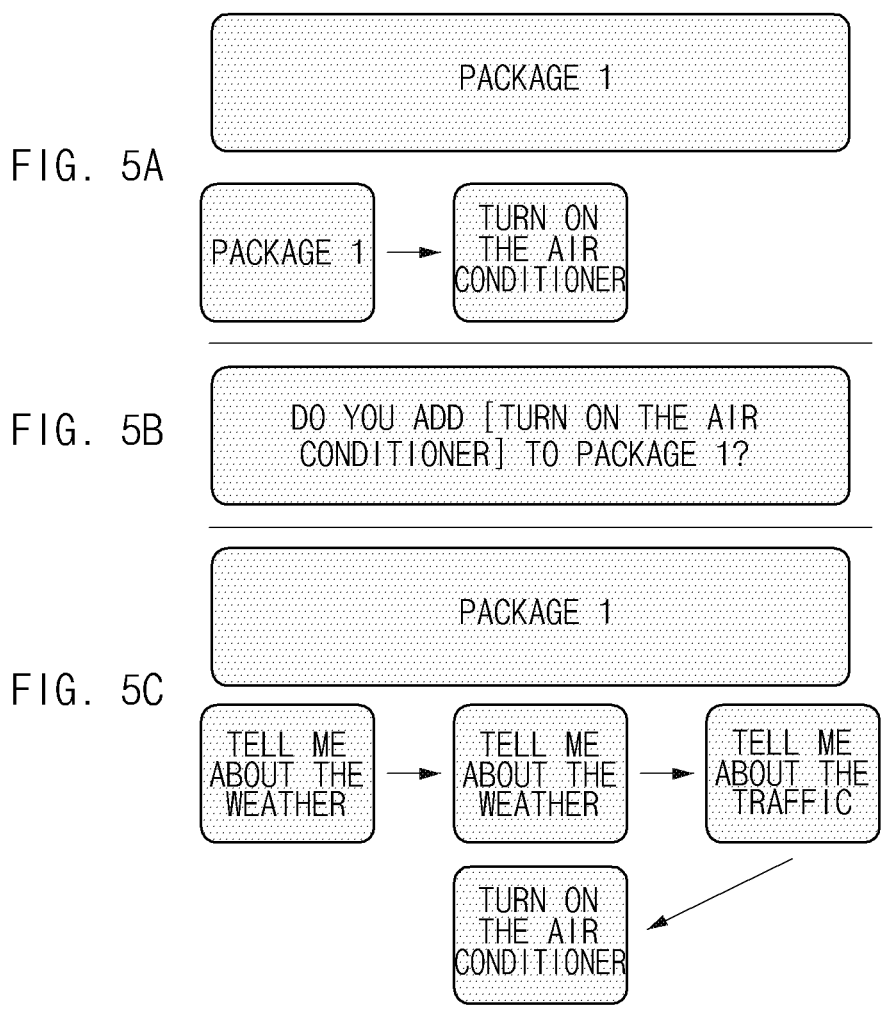
FIGS. 5A, 5B, and 5C are exemplary screens illustrating a process of correcting and registering an additionally uttered voice command with a previously generated package command, when another voice command is additionally uttered after the previously generated package command is uttered, according to an embodiment of the present disclosure.

FIGS. 5A-5C are exemplary screens illustrating a process of correcting and registering an additionally uttered voice command with a previously generated package command, when another voice command is additionally uttered after the previously generated package command is uttered, according to an embodiment of the present disclosure.

Referring to FIG. 5A, when a voice command "Turn on the air conditioner" is additionally uttered after package 1 with which a set of voice commands "Tell me about the weather", "Tell me about the stock information", and "Tell me about the traffic" are registered is uttered, a voice command recognition device 100 of FIG. 1 may propose adding the voice command "Turn on the air conditioner" to package 1 and may correct and register package 1 as shown in FIG. 5B.

Thereafter, as shown in FIG. 5C, when package 1 is uttered, the voice command recognition device 100 may perform four commands "Tell me about the weather", "Tell me about the stock information", "Tell me about the traffic", and "Turn on the air conditioner".

FIGS. 6A-6C show exemplary screens illustrating a process of correcting a previously generated package command depending on a surrounding situation when the previously generated package command is uttered, according to an embodiment of the present disclosure. In this case, the surrounding situation may include temperature outside the vehicle, weather, a season, humidity, illumination intensity, a vehicle speed, temperature inside the vehicle.

In FIG. 6A, when package 1 previously generated with voice commands which have domains of weather, stock, and traffic is uttered, a voice command recognition device 100 of FIG. 1 may notify a user of a domain incapable of providing real-time information among the weather, the stock, and the traffic. The voice command recognition device 100 may determine a day in conjunction with the stock. When today is a holiday, because it is difficult to provide stock information in real time, the voice command recognition device 100 may display an exemplary screen for notifying the user of the stock information based on a previous closing price.

In FIG. 6B, an embodiment is exemplified as, when package 1 previously generated with voice commands which have domains of weather, stock, and traffic is uttered, the voice command recognition device 100 determines a temperature in the vehicle, proposes turning on the air conditioner to the user when the temperature in the vehicle is high, and notifies the user of the weather, the stock, and the traffic in the state where the air conditioner is turned on when the user accepts the proposal.

In FIG. 6C, an embodiment of the present disclosure is exemplified as, when package 1 previously generated with voice commands which have domains of weather, stock, and traffic is uttered, the voice command recognition device 100 determines a current weather, season, temperature, humidity, or the like and proposes controlling the air conditioner in the vehicle, suitable for it. In FIG. 6C, an embodiment of the present disclosure is exemplified as, because the current season is winter, the voice command recognition device 100 proposes adding a heater and heating steering wheel operation to package 1.

Figure 7A:
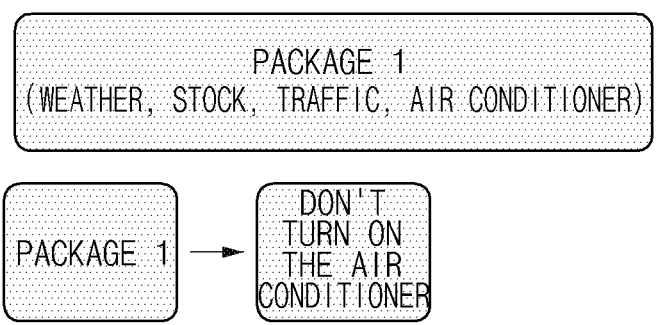
FIGS. 7A and 7B are drawings illustrating an exemplary screen when a command to request to cancel one of one or more commands registered with a previously generated package command is additionally uttered after the previously generated package command is uttered, according to an embodiment of the present disclosure.
Figure 7B:
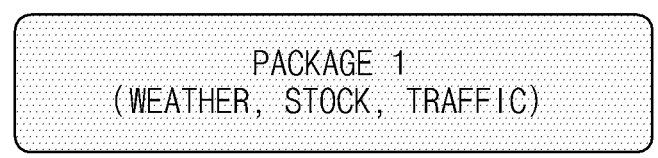

FIGS. 7A-7B are drawings illustrating an exemplary screen when a command to request to cancel one of one or more commands registered with a previously generated package command is additionally uttered after the previously generated package command is uttered, according to an embodiment of the present disclosure.

Referring to FIG. 7A, when a command to cancel the command to turn on the air conditioner is additionally uttered after package 1 with which voice commands associated with the weather, the stock, the traffic, and the air conditioner are registered is uttered, as in FIG. 7B, a voice command recognition device 100 of FIG. 1 may delete the command to turn on the air conditioner from package 1.

FIGS. 8A-8E are exemplary screens illustrating a process in which situations of FIGS. 3 to 7 are implemented in a complex manner, according to an embodiment of the present disclosure.

Figure 8A:
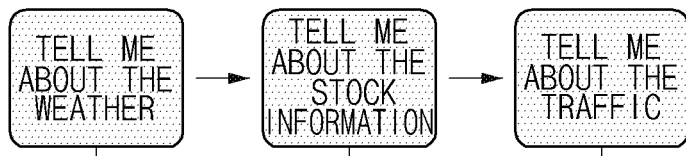

Referring to FIG. 8A, a voice command recognition device 100 of FIG. 1 may propose registering frequently used voice commands "Tell me about the weather", "Tell me about the stock information", and "Tell me about the traffic" as package 1 through analysis of one or more commands repeatedly used by a user and a voice command utterance pattern of the user.

Figure 8B:

As package 1 is generated, when a voice command "Turn on the air conditioner" is additionally uttered as in FIG. 8B after package 1 is uttered, as in FIG. 8C, the voice command recognition device 100 may output a screen for querying whether to add the voice command "Turn on the air conditioner" to package 1.

Figure 8D:
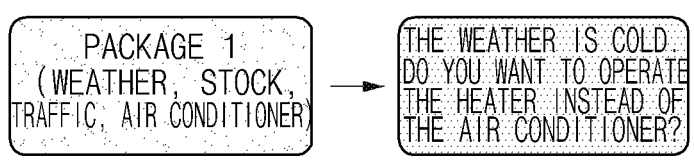
Figure 8E:
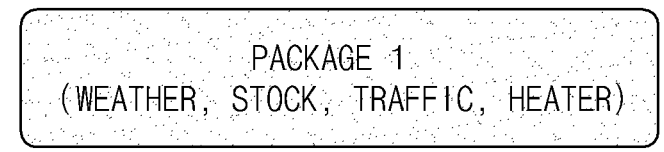

After the voice command "Turn on the air conditioner" is added to package 1, when package 1 is uttered, as shown in FIG. 8D, the voice command recognition device 100 may propose adding the command "Turn on the heater" instead of the voice command "Turn on the air conditioner" included in package 1 with regard to a surrounding situation. As shown in FIG. 8E, the voice command recognition device 100 may delete the command associated with the air conditioner from package 1 and may register commands associated with the weather, the stock, the traffic, and the heater with package 1.

As such, an embodiment of the present disclosure may register one or more commands, which are repeatedly used, as one package command (FIG. 3). An embodiment of the present disclosure may analyze a voice command utterance pattern of the user and may register one or more voice commands as one package command (FIG. 4).

Furthermore, when one or more voice commands are additionally uttered after a previously generated package command is uttered, an embodiment of the present disclosure may add the voice command to the previously generated package command and may correct and register the package command (FIG. 5).

Furthermore, an embodiment of the present disclosure may determine a current surrounding situation and may change and perform a previously generated package command (FIG. 6).

Furthermore, when a command to cancel one of one or more voice commands registered as a package command is uttered after a previously generated package command is uttered, an embodiment of the present disclosure may reflect the command to cancel the one of the one or more voice commands to delete the voice command requested to be canceled from the previously generated package command.

Figure 9:
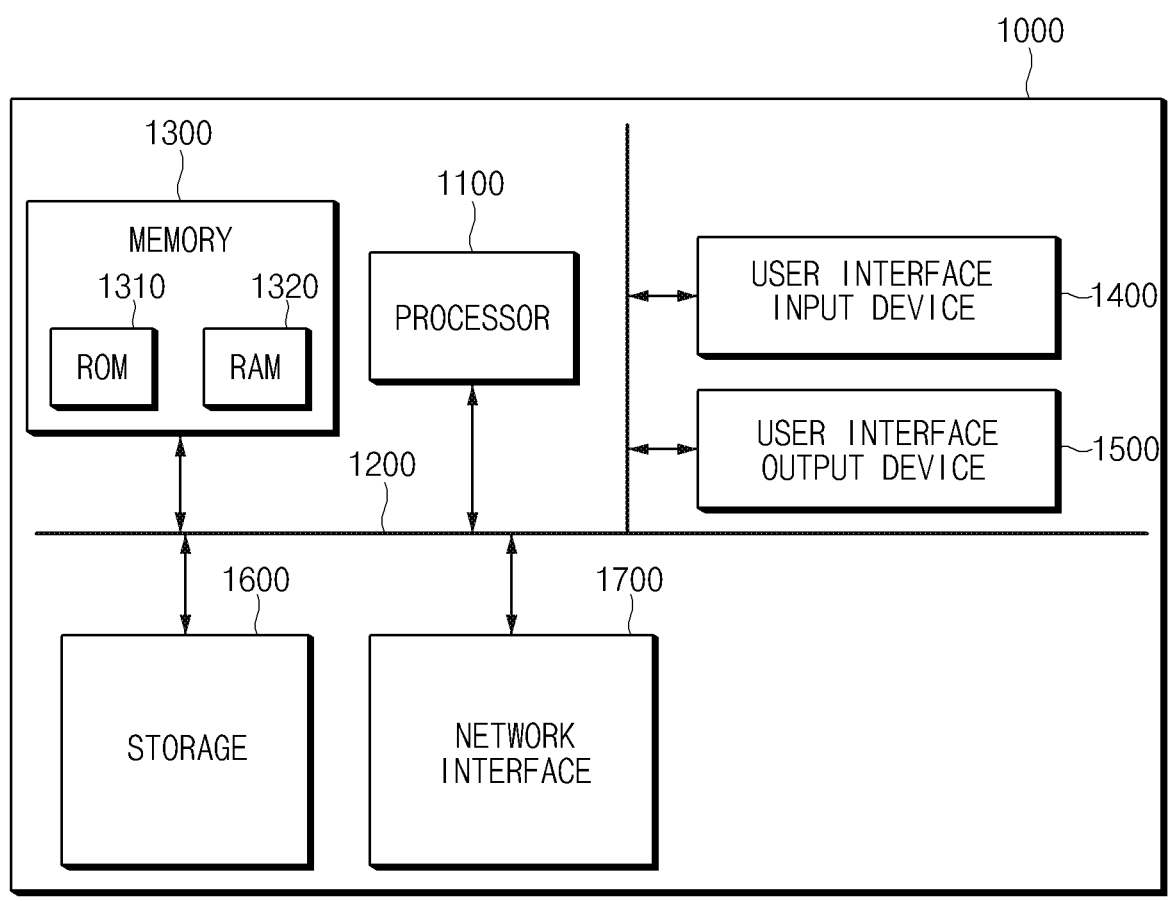
FIG. 9 is a block diagram illustrating a computing system according to an embodiment of the present disclosure.

FIG. 9 is a block diagram illustrating a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may analyze one or more voice commands repeatedly used by the user or a voice command utterance pattern of the user to register the one or more voice commands as one package command and may determine whether to perform separate commands in the package command sequentially or at the same time, when the one package command is uttered, to perform the one or more registered voice commands sequentially or at the same time, thus increasing convenience of the user.

The present technology may analyze a voice command additionally uttered after one previously generated package command is uttered and may perform one of addition, correction, or deletion for the one package command, thus increasing convenience of the user.

The present technology may determine a current surrounding situation, when one previously generated package command is uttered, and may perform one of addition, correction, or deletion for the one package command, thus increasing convenience of the user.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A voice command recognition device for a vehicle, comprising:
   a processor configured to register one or more voice commands selected by analyzing one or more voice commands repeatedly used by a user or a voice command utterance pattern of the user to generate one package command in the vehicle; and
   a storage storing data or an algorithm for speech recognition by the processor;
   wherein the processor determines whether to perform the one or more voice commands, registered with the one package command, sequentially or at the same time, when the one package command is uttered;
   wherein the processor performs the one or more voice commands sequentially when domains of the one or more voice commands registered with the one package command are the same as each other and performs the one or more voice commands at the same time when the domains differ from each other;
   wherein the domains include a category of information requested by the one or more voice commands; and
   wherein the processor performs the one or more voice commands by executing one or more operations of the vehicle or outputting requested information to the user in the vehicle.

2. The voice command recognition device of claim 1, wherein the processor previously collects information about a voice command to be performed subsequently when sequentially performing the one or more voice commands registered with the one package command, after the one package command is uttered.

3. The voice command recognition device of claim 1, wherein the processor analyzes the voice command utterance pattern by identifying whether there is a command performed sequentially within a threshold time after one command is uttered and generates the command as the one package command when the command performed sequentially within the threshold time is uttered over a predetermined number of times.

4. The voice command recognition device of claim 3, wherein the processor recognizes that a same command is performed although the one or more voice commands are changed in order and are uttered and increases a number of utterances.

5. The voice command recognition device of claim 1, wherein the processor additionally registers an additionally uttered voice command with the one package command, when there is the voice command additionally uttered after the one package command is uttered.

6. The voice command recognition device of claim 5, wherein the processor performs one or more voice commands previously registered with the one package command and the additionally uttered voice command together, when the one package command with which the additionally uttered voice command is additionally registered is uttered.

7. The voice command recognition device of claim 1, wherein the processor deletes a voice command requested to be canceled among the one or more voice commands registered with the one package command, when the command to request to cancel one of the one or more voice commands registered with the package command is additionally uttered, after the one package command is uttered.

8. The voice command recognition device of claim 7, wherein the processor performs the other voice commands except for the command deleted among one or more voice commands previously registered with the one package command, when a package command from which the voice command requested to be deleted is deleted is uttered.

9. The voice command recognition device of claim 1, wherein the processor proposes correcting some of one or more voice commands registered with the one package command or adding a voice command, based on a surrounding situation, when the one package command is uttered.

10. The voice command recognition device of claim 9, wherein the surrounding situation includes at least one or more of temperature, humidity, weather, illumination intensity, a season, a date, a day, a time, a location, a traffic situation, or a vehicle speed.

11. The voice command recognition device of claim 1, wherein the processor analyzes a voice command additionally uttered after the one package command is uttered and performs at least one or more of correction, deletion, or addition for the one package command.

12. A voice command recognition method, comprising:
analyzing one or more voice commands repeatedly used by a user of a vehicle or a voice command utterance pattern of the user;
registering one or more voice commands selected by the analysis of the one or more voice commands repeatedly used by the user or the voice command utterance pattern of the user to generate one package command in the vehicle;
determining whether to perform the one or more voice commands, registered with the one package command, sequentially or at the same time, when the one package command is uttered; and
performing the one or more voice commands sequentially when domains of the one or more voice commands registered with the one package command are the same as each other and performing the one or more voice commands at the same time when the domains differ from each other;
wherein the domains include a category of information requested by the one or more voice commands; and
wherein the one or more voice commands are performed by executing one or more operations of the vehicle or outputting requested information to the user in the vehicle.

13. The voice command recognition method of claim 12, further comprising:
previously collecting information about a voice command to be performed subsequently when sequentially performing the one or more voice commands registered with the one package command, after the one package command is uttered.

14. The voice command recognition method of claim 12, wherein the generating of the one package command includes:
analyzing the voice command utterance pattern by identifying whether there is a command performed sequentially within a threshold time after one command is uttered and generating the command as the one package command when the command performed sequentially within the threshold time is uttered over a predetermined number of times; and
recognizing that a same command is performed although the one or more voice commands are changed in order and are uttered and increasing a number of utterances.

15. The voice command recognition method of claim 12, further comprising:
additionally registering an additionally uttered voice command with the one package command, when there is the voice command additionally uttered after the one package command is uttered.

16. The voice command recognition method of claim 12, further comprising:
deleting a voice command requested to be canceled among the one or more voice commands registered with the one package command, when the command to request to cancel one of the one or more voice commands registered with the package command is additionally uttered, after the one package command is uttered.

17. The voice command recognition method of claim 12, further comprising:
proposing correcting some of the one or more voice commands registered with the one package command or adding a voice command, based on a surrounding situation, when the one package command is uttered; and
analyzing a voice command additionally uttered after the one package command is uttered and performing at least one of correction, deletion, or addition for the one package command.

* * * * *